(12) United States Patent
Chen et al.

(10) Patent No.: US 11,068,775 B2
(45) Date of Patent: Jul. 20, 2021

(54) PROCESSING APPARATUS AND METHOD FOR ARTIFICIAL NEURON

(71) Applicant: British Cayman Islands Intelligo Technology Inc., Grand Cayman (KY)

(72) Inventors: Hong-Ching Chen, Zhubei (TW); Chun-Ming Huang, Zhubei (TW); Chi-Hao Chen, Zhubei (TW); Tsung-Liang Chen, Zhubei (TW)

(73) Assignee: BRITISH CAYMAN ISLANDS INTELLIGO TECHNOLOGY INC., Grand Cayman (KY)

( * ) Notice: Subject to any disclaimer, the term of this patent is extended or adjusted under 35 U.S.C. 154(b) by 811 days.

(21) Appl. No.: 15/910,404

(22) Filed: Mar. 2, 2018

(65) Prior Publication Data

US 2018/0285737 A1    Oct. 4, 2018

Related U.S. Application Data

(60) Provisional application No. 62/478,066, filed on Mar. 29, 2017.

(51) Int. Cl.
*G06N 3/06*     (2006.01)
*G06N 3/063*    (2006.01)

(52) U.S. Cl.
CPC ........... *G06N 3/063* (2013.01); *G06N 3/0635* (2013.01)

(58) Field of Classification Search
None
See application file for complete search history.

(56) References Cited

U.S. PATENT DOCUMENTS 10,769,519 B2 * 9/2020 Alvarez-Icaza Rivera ................. G06N 3/06
2019/0102672 A1 * 4/2019 Bifulco ................. G06N 3/063

OTHER PUBLICATIONS

Wu, Jian. A router for massively-parallel neural simulation. Diss. University of Manchester, 2010, 165 pages. (Year: 2010).*

* cited by examiner

*Primary Examiner* — Vincent Gonzales
(74) *Attorney, Agent, or Firm* — Muncy, Geissler, Olds & Lowe, PC

(57) ABSTRACT

A processing apparatus applied in an artificial neuron is disclosed. The processing apparatus comprises a parser, a lookup array, a summing circuit and a MAC circuit. The parser parses one of M packets to extract a non-zero weight value from a header of the one packet, to identify a plurality of bit positions with a specified digit from a payload of the one packet, and to output the non-zero weight value and the bit positions in parallel. The lookup array contains N synapse values and is indexed by the bit positions in parallel to generate a plurality of match values. The summing circuit sums up the match values to generate a sum value. The MAC circuit generates a product of the non-zero weight value and the sum value, and generates an accumulate value based on the product and at least one previous accumulate value.

11 Claims, 7 Drawing Sheets

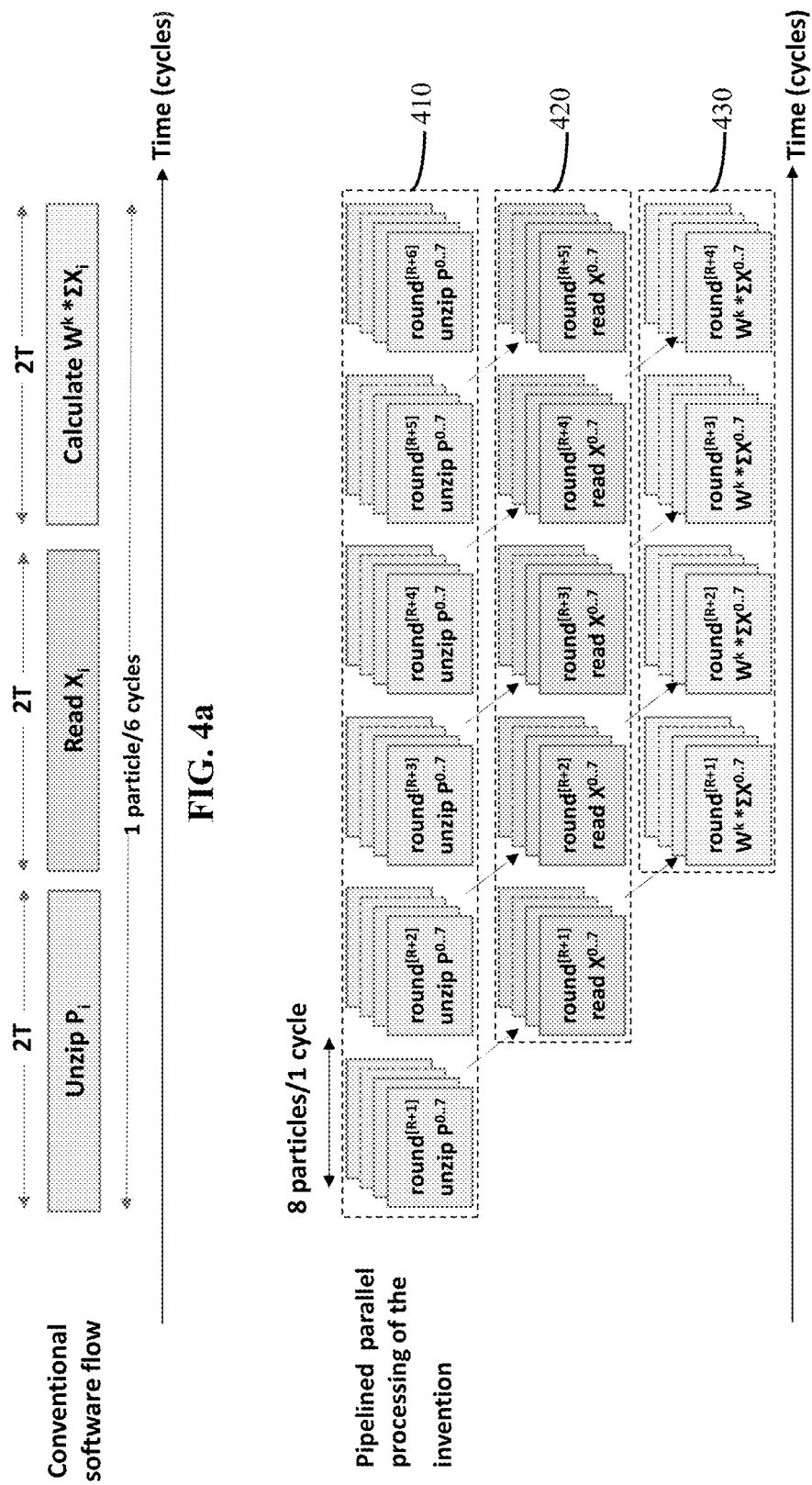

PROCESSING APPARATUS AND METHOD FOR ARTIFICIAL NEURON

CROSS-REFERENCE TO RELATED APPLICATION

This application claims priority under 35 USC 119(e) to U.S. provisional application No. 62/478,066, filed on Mar. 29, 2017, the content of which is incorporated herein by reference in its entirety.

BACKGROUND OF THE INVENTION

Field of the Invention

The invention relates to an integrated circuit, and more particularly, to a processing apparatus and method for use in artificial neuron.

Description of the Related Art

An artificial neural network (ANN) is based on a collection of connected neurons. When processing and propagating input signals, the input values (hereinafter called "synapse values") supplied to the neuron's synapses are each modulated by the synapses' respective weight values. The effect of this process is to pass a portion of the synapse value through the synapse, which is proportional to the weight value. In this way, the weight value modulates the connection strength of the synapse. The result is then summed with the other similarly processed synapse values. Respective neurons receive the weighted input from the neuron in the previous stage and calculate the sum of the products. A propagation function for each neuron can be described mathematically as follows: $r=\Sigma_{i=0}^{N-1} Wi*Xi$, where r is the output value of a given neuron's propagation function, "Xi" is the synapse value supplied/inputted to the neuron's synapse i, Wi is the weight value for modulating the synapse value at the neuron's synapse i, and the total number of the neuron's synapses is N.

At present, neural networks are often executed by simulation software, using personal computers. However, as the size of the network increases, the software becomes more complex and the processing time increases. It is foreseeable that the operation of neurons could be performed by hardware, but as the number of inputs and the size of the memory increase, the cost and complexity of such hardware increases significantly. In practice, when a neural network is realized in the form of an integrated circuit, two shortcomings of the above propagation function are the requirement for numerous memory size for the weight values and the synapse values and for numerous multipliers which perform the multiplication operations between the synapse values and the weight values. Referring to the example of FIG. 1, assuming the case where the propagation function is computed directly, N=32 and the bit length for each weight value ($W_0$~$W_{31}$) is 16-bit, the memory size for the weight values $W_0$~$W_{31}$ is 512(=32*16) bits and the number of multipliers 10 is 32. The multipliers 10 are often large and complex taking significant portions of the available integrated circuit area, especially for the neurons that process large synapses since each synapse value is typically matched with a dedicated multiplier.

Hence, it is desirable to reduce the number of multipliers from neural networks as much as possible. Yet, it is still desirable to simplify the design and reduce the physical size and the power consumption of the neurons, thereby allowing more neurons per unit area on the integrated circuit and processing at high speed and with low power consumption.

SUMMARY OF THE INVENTION

In view of the above-mentioned problems, an object of the invention is to provide a processing apparatus to reduce the number of multipliers and the memory size for the weight values.

One embodiment of the invention provides a processing apparatus applied in an artificial neuron. The processing apparatus comprises a parser, a lookup array, a summing circuit and a multiply-accumulate (MAC) circuit. The parser sequentially receives M packets and parses one of the M packets to extract a non-zero weight value from a header of the one packet, to identify a plurality of bit positions with a specified digit from a payload of the one packet, and to output the non-zero weight value and the plurality of bit positions in parallel. The lookup array contains N synapse values and is indexed by the plurality of bit positions in parallel to generate a plurality of match values. The summing circuit sums up the plurality of match values to generate a sum value. The MAC circuit generates a product of the non-zero weight value and the sum value, and generates an accumulate value based on the product and at least one previous accumulate value. Here, the number of bits in the payload is equal to N, and the plurality of bit positions with the specified digit in the payload correspond to the index numbers for the non-zero weight value located in an array consisting of N weight values.

Another embodiment of the invention provides a processing method applied in an artificial neuron. The method comprises: sequentially receiving M packets; parsing one of the M packets to extract a non-zero weight value from a header of the one packet, to identify a plurality of bit positions with a specified digit from a payload of the one packet, and to output the non-zero weight value and the plurality of bit positions in parallel; fetching a plurality of match values from a lookup array containing N synapse values and indexed by the plurality of bit positions in parallel; summing up the plurality of match values to obtain a sum value; obtaining a product of the non-zero weight value and the sum value; accumulating the product; and, repeating the steps of parsing, fetching, summing, obtaining and accumulating until all of the M packets are processed to obtain an accumulate value. Here, the number of bits in the payload is equal to N, and the plurality of bit positions with the specified digit in the payload correspond to the index numbers for the non-zero weight value located in an array consisting of N weight values.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2b shows exemplary SVG packets based on FIG. 2a.

FIG. 4a shows a timing diagram of a conventional software flow that processes the operations of "unzip $P_i$", "Read $X_i$" and "calculate $W^k * \Sigma X_i$" in sequence for each particle.

FIG. 4b shows a timing diagram of three parallel pipeline stages for implementing the pipelined parallel processing architecture in the invention.

DETAILED DESCRIPTION OF THE INVENTION

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context.

A feature of the invention is to rearrange the sequence of operations for computing the propagation function in an artificial neuron to reduce the number of multipliers (or multiplication operations) and the memory size for the weight values. Another feature of the invention is to adopt a pipelined parallel processing architecture (described below) for neurons in the form of an integrated circuit to accelerate the computation of the propagation function. Another feature of the invention is to use different clock rates (described below) for different components/devices in an artificial neuron to trade off hardware cost, power consumption and performance.

Figure 1:
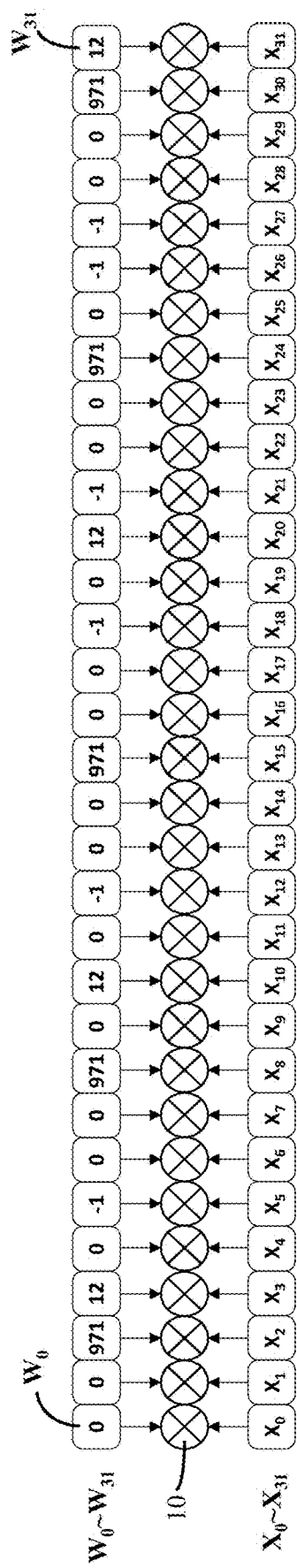
FIG. 1 is an example showing thirty-two weight values $W_0 \sim W_{31}$ are multiplied by thirty-two synapse values $X_0 \sim X_{31}$ using thirty-two multipliers in a conventional artificial neuron.
Figure 2B:
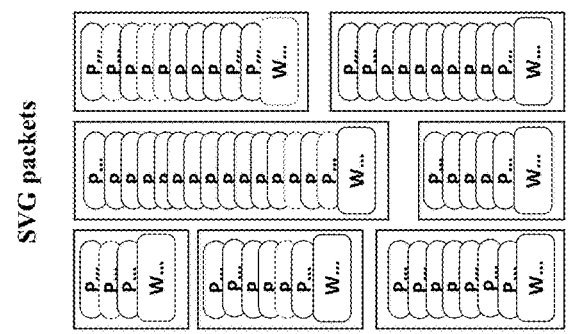
Figure 2A:
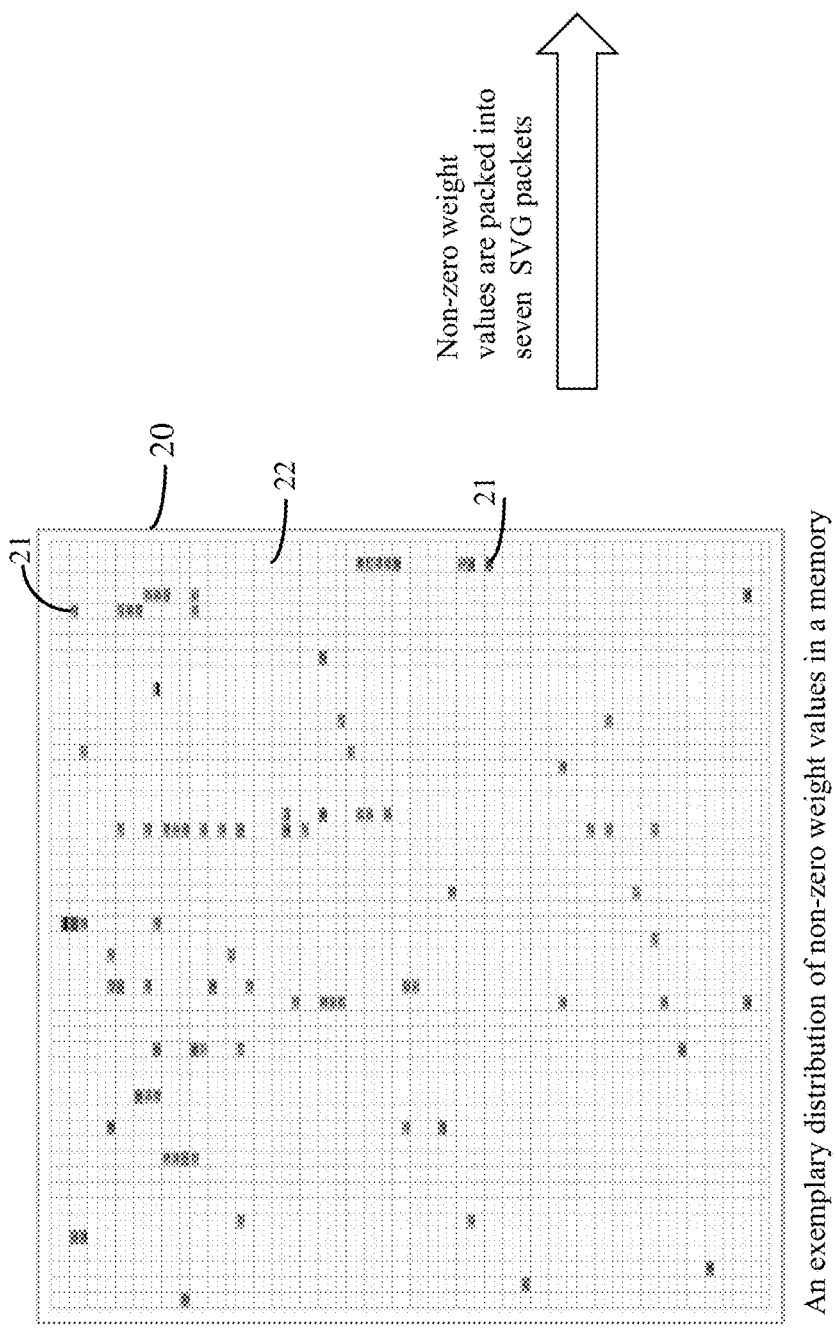
FIG. 2a shows an exemplary distribution of non-zero weight values stored in a memory device.

In a general ANN system, non-zero weight values are sparse and clustered. FIG. 2a shows an exemplary distribution of non-zero weight values stored in a memory device. Referring to FIG. 2a, the weight values are sequentially stored in a memory device 20, where each blank rectangle 22 denotes a zero weight value and each filled rectangle 21 denotes a non-zero weight value. As can be seen in the example of FIG. 1, lots of weight values are zero while non-zero weight values are respectively clustered at 971, 12 and −1. In view of the above fact, the sequence of operations used in the propagation function is rearranged in the invention.

For purposes of clarity and ease of description, the set of the weight values $W_0 \sim W_{31}$ in FIG. 1 is regarded as a one-dimensional indexed weight array W of thirty-two 16-bit elements (i.e., weight values); an individual element Wi is selected from the array W by an index number (or subscript) i, where i=0-31; the following embodiments and examples are described in terms of the set of the weight values $W_0 \sim W_{31}$ and the set of synapse values $X_0 \sim X_{31}$ in FIG. 1. It should be understood that the number (N=32) of elements in the array W in FIG. 1 is provided by way of example and not limitation of the invention.

Figure 3A:
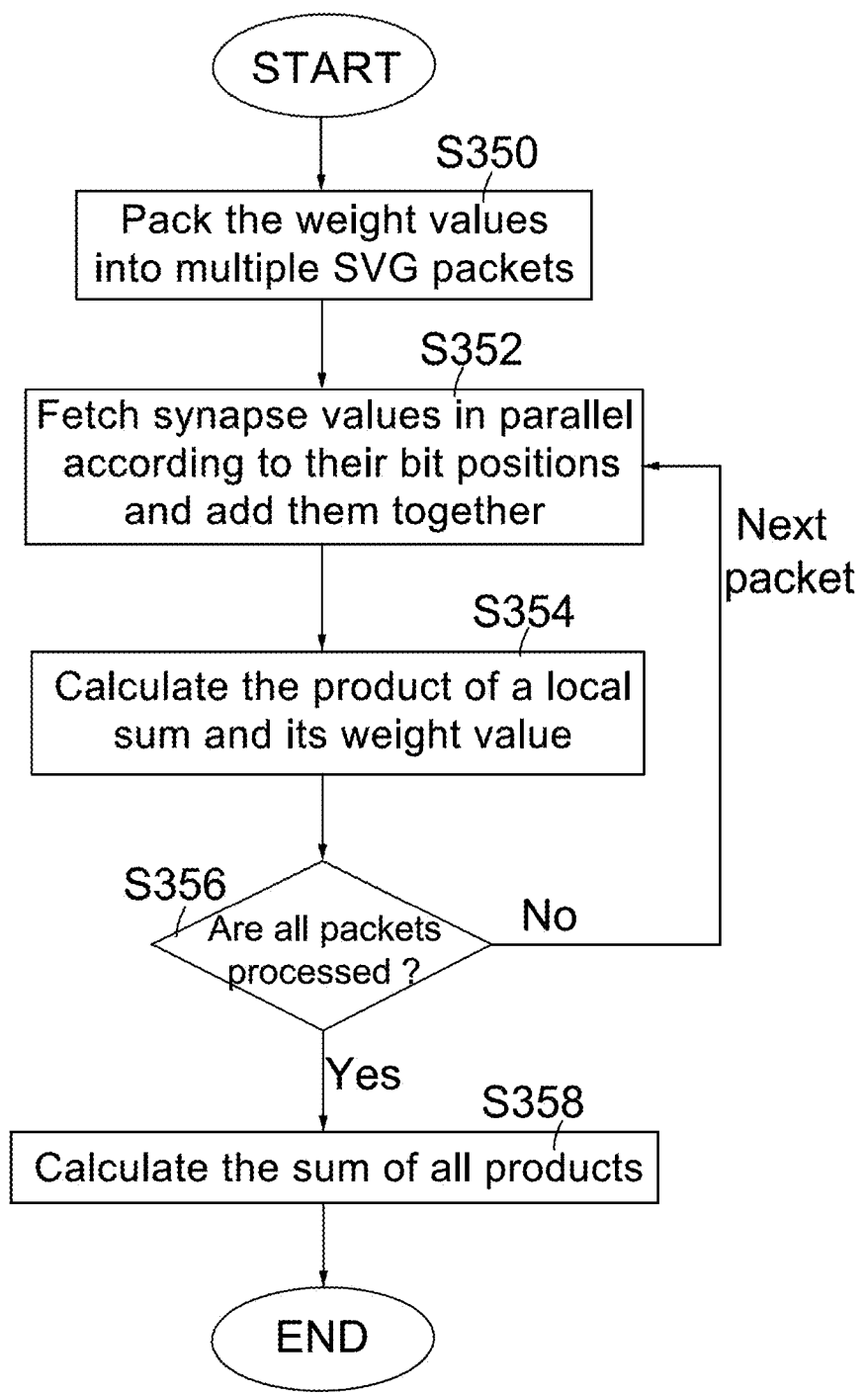
FIG. 3a is a flow chart showing a processing method according to the invention.

FIG. 3a is a flow chart showing a processing method according to the invention. Hereinafter, the processing method of the invention is described with reference to FIGS. 2 and 3a-3b.

Figure 3B:
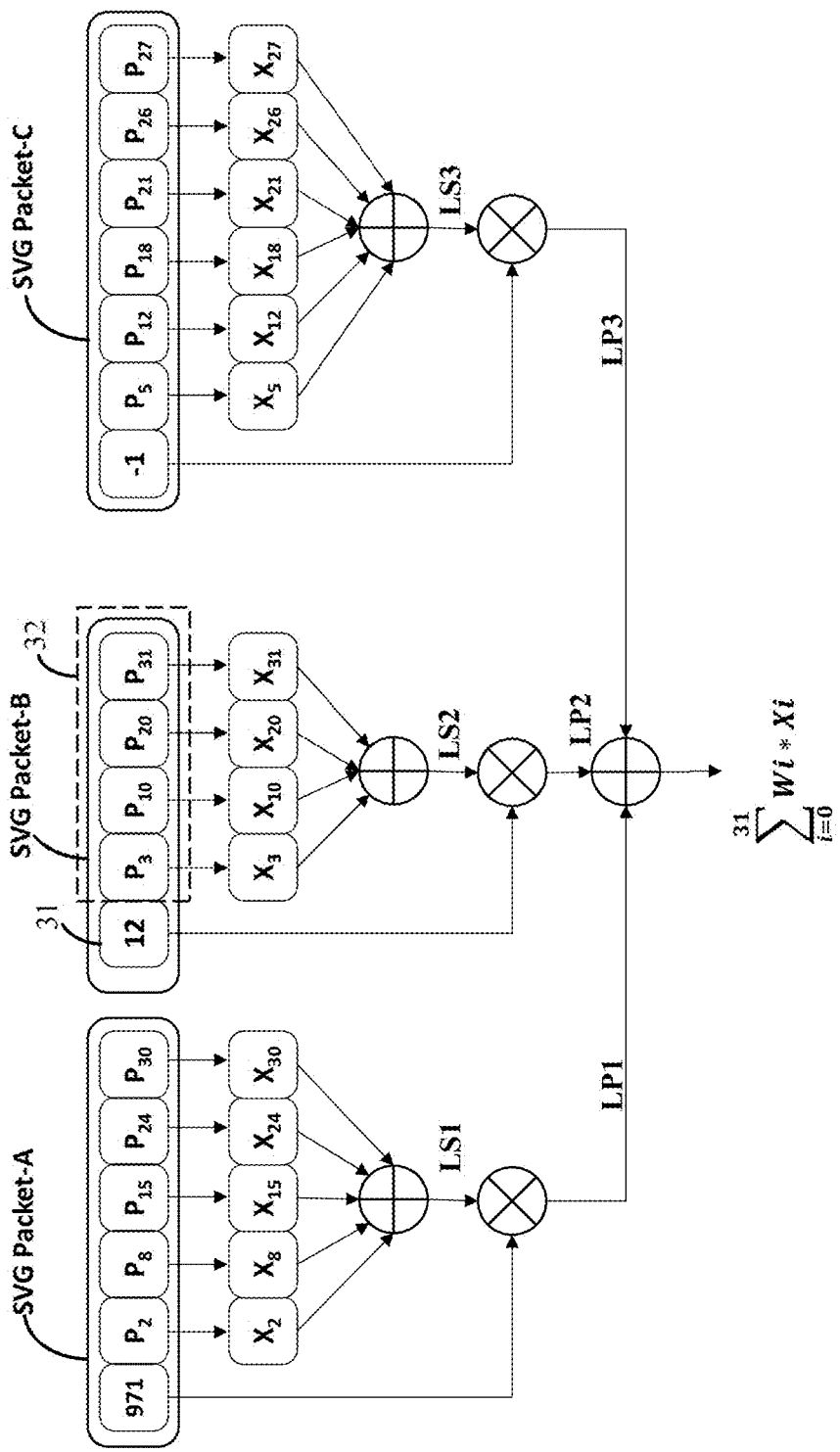
FIG. 3b shows a re-arranged sequence of operations for the propagation function based on the thirty-two weight values $W_0 \sim W_{31}$ and the thirty-two synapse values $X_0 \sim X_{31}$ in FIG. 1 according to an embodiment of the invention.

Step S350: Pack a set of weight values associated with a given neuron into multiple same-value-group (SVG) packets. FIG. 3b shows a re-arranged sequence of operations for the propagation function according to the thirty-two weight values $W_0 \sim W_{31}$ and the thirty-two synapse values $X_0 \sim X_{31}$ in FIG. 1. Take FIGS. 1 and 3b, for example, the set of the weight values $W_0 \sim W_{31}$, especially the non-zero weight values (971, 12 and −1), associated with a given neuron are packed into three SVG packets (A, B and C). As another example, the non-zero weight values in memory device 20 are packed into seven SVG packets in FIG. 2b. Each SVG packet contains a header 31 and a payload 32 as shown in FIG. 3b. The header 31 contains a specified non-zero weight value, and the number of bits in the payload 32 is equal to the number of the weight values associated with a given neuron. In the examples of FIGS. 1 and 3b, the number of bits in the payload 32 is equal to N (=32). The bit positions (or called "particles" in this specification) Pi in the payload 32 are assigned with a digit of "1" if elements at corresponding indices in the array W are equal to the specified non-zero weight value, and the other bit positions are assigned with "0". For instance, FIG. 1 shows all the weight values $W_3$, $W_{10}$, $W_{20}$ and $W_{31}$ are equal to 12 and thus they are packed into the same SVG packet-B in FIG. 3b. Referring to the SVG packet-B in FIG. 3b, the header 31 contains the value of 12, and the number of bits in the payload 32 is 32 (not shown). Besides, since the index numbers i for the weight values $W_3$, $W_{10}$, $W_{20}$ and $W_{31}$ in the array W are 3, 10, 20 and 31, respectively, the bit positions (or particles) $P_3$, $P_{10}$, $P_{20}$ and $P_{31}$ in the payload 32 are assigned with "1" while the other bit positions are assigned with "0".

Step 352: fetch corresponding synapse values according to the bit positions Pi with a bit value of "1" in the payload 32 of the SVG packet in parallel and add them together. Referring again to the SVG packet-B in FIG. 3b, corresponding synapse values ($X_3$, $X_{10}$, $X_{20}$, $X_{31}$) are fetched in parallel and then summed up to obtain a local sum LS2 (=$X_3+X_{10}+X_{20}+X_{31}$) according to the bit positions ($P_3$, $P_{10}$, $P_{20}$, $P_{31}$) in the payload 32.

Step 354: Calculate the product LP of the local sum LS and its non-weight value for each SVG packet. For the SVG packet-B in FIG. 3b, its product LP2 is equal to (12*LS2).

Step S356: Determine whether all SVG packets are processed. If YES, the flow goes to Step S358; otherwise, the flow goes to Step S352.

Step 358: Calculate the sum of all products LP for all SVG packets. In the example in FIG. 3b, the result of the propagation function is equal to the sum of all products (LP1+LP2+LP3).

In FIG. 3b, there are three SVG packets, and the bit lengths for each header (weight value) 31 and the payload 32 are 16-bit and 32-bit, respectively. Accordingly, the memory size for the weight values $W_0 \sim W_{31}$ is 144 bits (=3*(16 bits+32 bits)); moreover, only three multipliers are needed. Thus, in comparison with FIG. 1, the re-arranged sequence of operations in FIG. 3b of the invention reduces the memory size for the weight values $W_0 \sim W_{31}$ to 28% (=144/512) and the number of multipliers (or multiplication operations) to 9% (=3/32).

Even though the invention has the advantages of SVG packets and the re-arranged sequence of operations, general CPUs or digital signal processors (DSPs) are supposed to compute the associated operations on a particle-by-particle basis. For example, in a case that the propagation function of one neuron is executed by software, the implementation of the SVG packets and the re-arranged sequence of operations requires many clock cycles which are dependent from a result of previous clock cycles. FIG. 4a shows a timing diagram of a conventional software flow that processes the operations of "unzip $P_i$", "Read $X_i$" and "calculate $W_k * \Sigma X_i$" in sequence for each particle. As shown in the example of FIG. 4a, the unzip-read-calculate operations for each particle (i.e., bit position) $P_i$ need to be performed in sequence, one at a time. Therefore, it takes at least six clock cycles (6T) for a general CPU/DSP to compute unzip-read-calculate operations for each particle (i.e., bit position) $P_i$ of a given SVG packet.

As used herein and in the claims, the term "unzip $P_i$" refers to parsing (or decompressing) a given SVG packet to identify a bit position (or a particle) Pi whose bit value is equal to 1 in its payload 32. Similar or identical components are denoted using the same reference numerals in the drawings.

Figure 5:
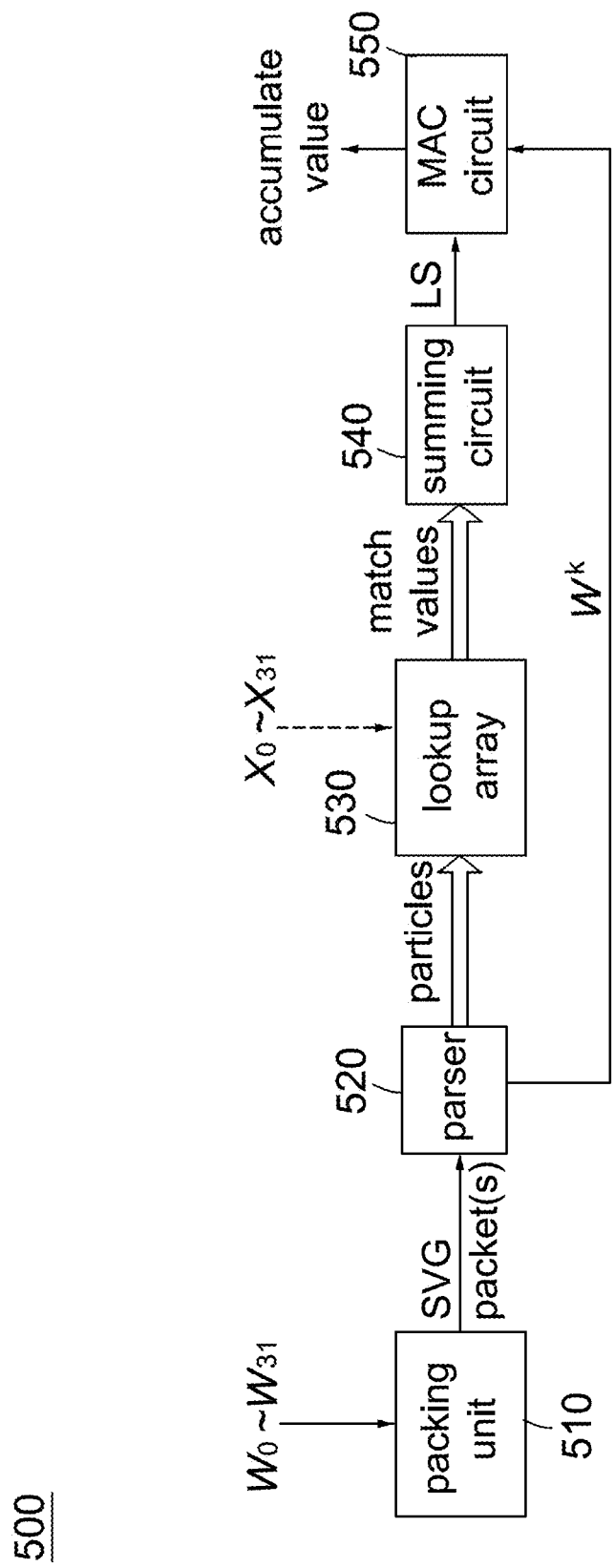
FIG. 5 is a block diagram of a processing apparatus according to the invention.

FIG. 5 is a block diagram of a processing apparatus according to the invention. Referring to FIG. 5, a processing apparatus 500 of the invention, applied in an artificial neuron, includes a packing unit 510, a parser 520, a lookup array 530, a summing circuit 540 and a multiplier-accumulator (MAC) circuit 550. It is noted that before the array W of thirty-two 16-bit elements in FIG. 1 are supplied to the packing unit 510, the lookup array 530 has already been updated with the set of the synapse values $X_0 \sim X_{31}$, and thus the input line for feeding the synapse values $X_0 \sim X_{31}$ to the lookup array 530 is dashed.

After receiving the array W of thirty-two 16-bit elements in FIG. 1, the packing unit 510 sorts the elements of the array W according to their values, packs the elements into M SVG packets according to M different non-zero elements and then outputs the M SVG packets sequentially, where $1 <= M <= N$. Each SVG packet includes a header and a payload. The header comprises a non-zero weight value while the number of bits in the payload is equal to N. The Q bit positions in the payload are assigned with 1 if the non-zero weight value is located at Q corresponding indices in the array W.

The parser 520 parses a first one of the M SVG packets, extracts a non-zero weight value $W^k$ from the header 31 of the first SVG packet, identifies Q bit positions Pi with a bit value of "1" from a payload 32 of the first SVG packet, and then outputs the non-zero weight value $W^k$ and the Q bit positions (particles) Pi in parallel, where $1 <= k <= M$. The lookup array 530 includes a memory device having a plurality of entries. Each entry pre-stores one of the synapse values $X_0 \sim X_{31}$ and is uniquely indexed by one of the bit positions Pi. Meanwhile, the entries of the lookup array 530 can be indexed by the Q bit positions Pi in parallel to generate their corresponding match values (or synapse values). Afterward, the summing circuit 540 adds all the match values together to output a local sum LS1 for the first SVG packet. Finally, the MAC circuit 550 generates a product LP1 of the non-zero weight value $W^k$ and the sum LS1 for the first SVG packet, and then provides an accumulate value that is a sum of the products LP for the M SVG packets. In computing, a multiply-accumulate (MAC) operation is a common step that computes the product of two numbers and adds the product to an accumulator. The hardware unit that performs the MAC operation is known as a multiplier-accumulator (MAC circuit).

To further accelerate the computation for each SVG packet, the processing apparatus 500 of the invention uses a pipelined parallel processing architecture. FIG. 4b shows a timing diagram of three parallel pipeline stages for implementing the pipelined parallel processing architecture in the invention. In FIG. 4b, it is assumed that in each round (at a time), eight particles are identified by the parser 520 (unzip $P^{0 \cdots 7}$), eight corresponding synapse values are fetched by the lookup array 530 (read $X^{0 \cdots 7}$), and the product (LP) of $W^k$ and $\Sigma X^{0 \cdots 7}$ for each SVG packet is calculated by the summing circuit 540 and the MAC circuit 550 (calculate $W^k * \Sigma X^{0 \cdots 7}$). In the specification and drawings, the superscripts for P, X and W correspond to respective particle numbers, synapse value numbers and non-zero weight value numbers, respectively.

As shown in FIG. 4b, a first stage 410 processes the "unzip $P^{0 \cdots 7}$" operation, a second stage 420 processes the "read $X^{0 \cdots 7}$" operation and a third stage 430 processes the "calculate $W^k * \Sigma X^{0 \cdots 7}$" operation. In this pipelined parallel processing architecture, the "unzip $P^{0 \cdots 7}$" processing in round $[R+1]$ precedes the "read $X^{0 \cdots 7}$" processing in round $[R+1]$ and the "read $X^{0 \cdots 7}$" processing in round $[R+1]$ precedes the "calculate $W^k * \Sigma X^{0 \cdots 7}$" processing in round $[R+1]$ so that the bit positions $P^{0 \cdots 7}$ can be used to fetch the corresponding synapse values $X^{0 \cdots 7}$ and the synapse values $X^{0 \cdots 7}$ can be used in the "calculate $W^k * \Sigma X^{0 \cdots 7}$" processing. While the "read $X^{0 \cdots 7}$" processing in round $[R+1]$ is being performed, the next "unzip $P^{0 \cdots 7}$" processing in round $[R+2]$ is performed in parallel. While the "calculate $W^k * \Sigma X^{0 \cdots 7}$" processing in round $[R+1]$ is being performed, the next "read $X^{0 \cdots 7}$" processing in round $[R+2]$ and the next "unzip $P^{0 \cdots 7}$" processing in round $[R+3]$ are performed in parallel. In this manner, the pipelined parallel processing architecture of the invention extremely parallelizes the computation and significantly improves the processing speed needed to compute the result of the given neuron's propagation function.

Figure 6:
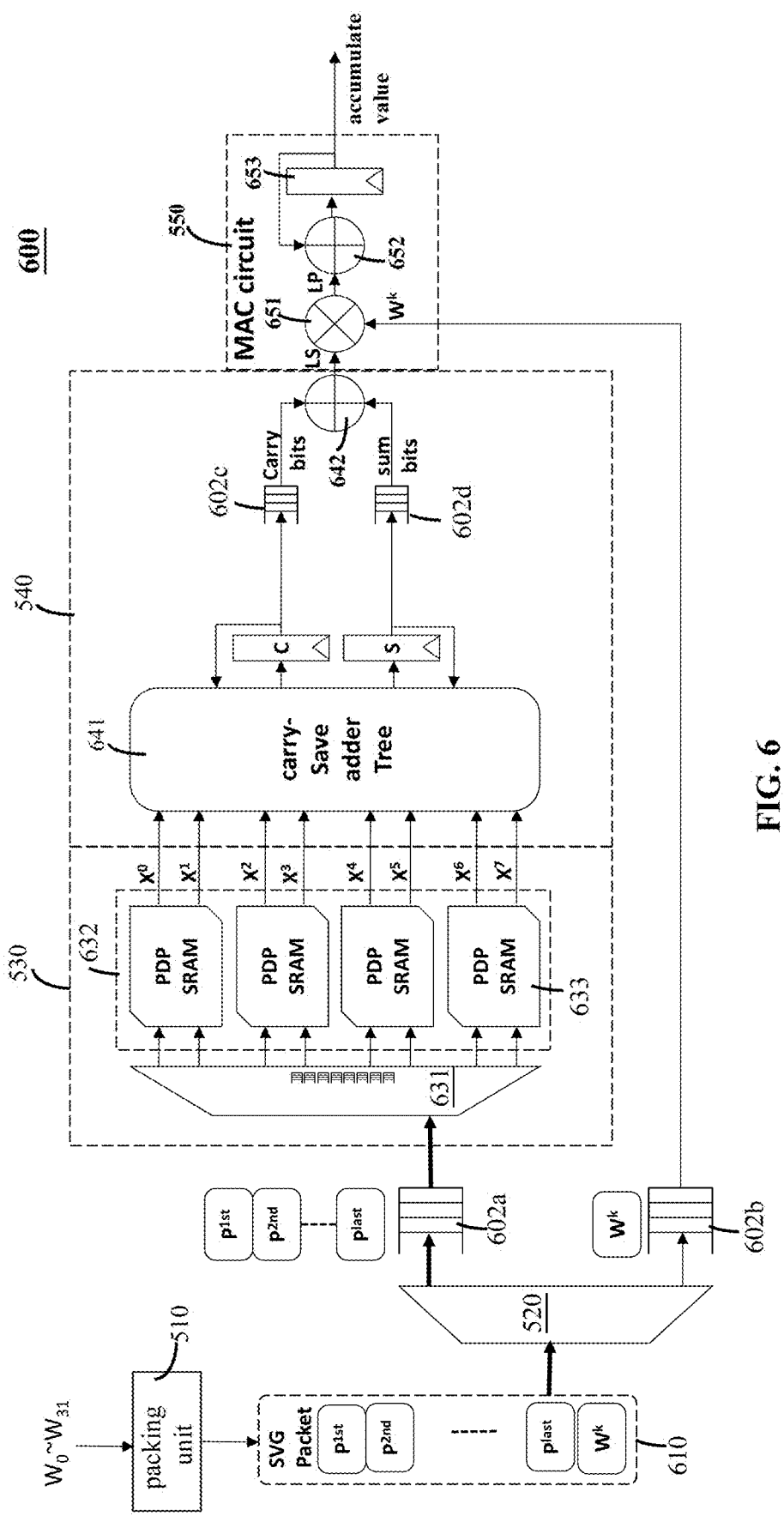
FIG. 6 is a schematic diagram showing a processing apparatus according to an embodiment of the invention.

FIG. 6 is a schematic diagram showing a processing apparatus according to an embodiment of the invention. Comparing FIGS. 5 and 6, the lookup array 530 is implemented using a scheduler 631 and a pseudo dual port (PDP) SRAM device 632; the summing circuit 540 is implemented using a carry-save adder tree 641 and a look-ahead carry adder (LCA) 642; the multiplier-accumulator (MAC) circuit 550 is implemented using a multiplier 651, an adder 652 and an accumulator 653. It is noted that the components/devices identical to those in FIG. 5 are denoted using the same reference numerals, and descriptions thereof will be suitably omitted; four buffers 602a~d are used as queues and are optional in this invention.

In the lookup array 530, the PDP SRAM device 632 (that pre-stores the synapse values $X_0 \sim X_{31}$) is divided into four identical PDP SRAM banks 633, and the scheduler 631 is used to schedule the order of read requests (i.e., the bit positions $P^{1st} \sim P^{last}$) from the parser 520 (or from the queue 602a) to access the four PDP SRAM banks 633. Each of the four PDP SRAM banks 633 is enabled to be accessed as though it has dual input and output ports. Accordingly, the four PDP SRAM banks 633 may output at most eight synapse values ($X^0 \sim X^7$) concurrently and thus its memory bandwidth is maximized. Correspondingly, in the summing circuit 540, the carry-save adder tree 641 is a tree of 3-input carry-save adders (not shown), each outputting a sum and a carry bit, as is well-known in the art. The carry-save adder tree 641 adds at most eight synapse values ($X^0 \sim X^7$) together and then the final carry and sum bits are output from carry-save adder tree 641 to the LCA 642 which generates the final sum LS1 for a first SVG packet 610. In the MAC circuit 550, the multiplier 651 generates a product value LP of the weight value $W^k$ and the sum LS1 for the first SVG packet 610; the adder 652 adds the product value LP1 and the output of the accumulator 653 to output an intermediate result. Then, the accumulator 653 receives the intermediate results from the adder 652, provides the intermediate results back to the adder 652 for the additional MAC steps or subsequent SVG packets, and finally outputs an accumulate value.

The off-line pre-encoded particle information in SVG packets, the scheduler 631 and the PDP SRAM device 632 maximize the parallelism of particle access. Moreover, in one embodiment, both the lookup array 530 and the carry-save adder tree 641 operate at a higher clock rate C1 to improve performance and to reduce the cost of hardware parallelism; the LCA 642 and the MAC circuit 550 operate at a lower clock rate C2 to improve power efficiency, where C1>C2. According to the invention, components/devices operating at different clock rates are used to trade off hardware cost, power consumption and performance.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A processing apparatus applied in an artificial neuron, comprising:
    a parser for sequentially receiving M packets and for parsing one of the M packets to extract a non-zero weight value from a header of the one packet, to identify a plurality of bit positions with a specified digit from a payload of the one packet, and to output the non-zero weight value and the plurality of bit positions in parallel;
    a lookup array containing N synapse values and indexed by the plurality of bit positions in parallel to generate a plurality of match values;
    a summing circuit for summing up the plurality of match values to generate a sum value; and
    a multiply-accumulate (MAC) circuit for generating a product of the non-zero weight value and the sum value, and for generating an accumulate value based on the product and at least one previous accumulate value;
    wherein the number of bits in the payload is equal to N; and
    wherein the plurality of bit positions with the specified digit in the payload correspond to the index numbers for the non-zero weight value located in an array consisting of N weight values.

2. The processing apparatus according to claim 1, further comprising:
    a packing unit for packing the N weight values into the M packets according to non-zero weight values out of the N weight values, where M<=N.

3. The processing apparatus according to claim 1, wherein each of the M packets comprises the header and the payload, wherein the header comprises one of M different non-zero weight values.

4. The processing apparatus according to claim 1, wherein the summing circuit comprises:
    a carry-save adder tree for receiving the plurality of match values to generate a plurality of sum bits and a plurality of carry bits; and
    a look-ahead carry adder (LCA) for adding the plurality of sum bits and the plurality of carry bits to generate the sum value;
    wherein the lookup array and the carry-save adder tree operate at a first clock rate while the LCA and the MAC circuit operate at a second clock rate; and
    wherein the first clock rate is greater than the second clock rate.

5. The processing apparatus according to claim 1, wherein the parser, the lookup array and the MAC circuit determine the plurality of bit positions in a current round (R+3), the plurality of match values in a first immediately previous round (R+2) and the product in a second immediately previous round (R+1), respectively, in parallel and substantially at the same time.

6. The processing apparatus according to claim 1, wherein the lookup array comprises:
    a scheduler for scheduling the order of the plurality of bit positions; and
    a pseudo dual port (PDP) SRAM device containing the N synapse values and indexed by the plurality of bit positions in parallel to generate the plurality of match values.

7. The processing apparatus according to claim 1, wherein the MAC circuit comprises:
    a multiplier for calculating the product of the non-zero weight value and the sum value;
    an adder for adding the product and the output of an accumulator to output an intermediate result; and
    the accumulator for receiving and providing the intermediate result back to the adder, and for outputting the accumulate value.

8. A processing method applied in an artificial neuron, comprising the steps of:
    sequentially receiving M packets;
    parsing one of the M packets to extract a non-zero weight value from a header of the one packet, to identify a plurality of bit positions with a specified digit from a payload of the one packet, and to output the non-zero weight value and the plurality of bit positions in parallel;
    fetching a plurality of match values from a lookup array containing N synapse values and indexed by the plurality of bit positions in parallel;
    summing up the plurality of match values to obtain a sum value;
    obtaining a product of the non-zero weight value and the sum value;
    accumulating the product; and
    repeating the steps of parsing, fetching, summing, obtaining and accumulating until all of the M packets are processed to obtain an accumulate value;
    wherein the number of bits in the payload is equal to N; and
    wherein the plurality of bit positions with the specified digit in the payload correspond to the index numbers for the non-zero weight value located in an array consisting of N weight values.

9. The processing method according to claim 8, further comprising:
    packing the N weight values into the M packets according to non-zero weight values out of the N weight values, where M<=N.

10. The processing method according to claim 8, wherein each of the M packets comprises the header and the payload, wherein the header comprises one of M different non-zero weight values.

11. The processing method according to claim 8, wherein the step of parsing in a current round (R+3), the step of fetching in a first immediately previous round (R+2) and the step of obtaining in a second immediately previous round (R+1) are executed in parallel and substantially at the same time.

* * * * *